United States Patent [19]

Goto et al.

[11] 3,916,359

[45] Oct. 28, 1975

[54] CHANNEL NUMBER INDICATING DEVICE FOR TELEVISION RECEIVER

[75] Inventors: Masaaki Goto, Yokohama; Hideo Ishigami, Yokosuka; Tathuhisa Mathunaga, Yokohama, all of Japan

[73] Assignee: Hitachi, Ltd., Japan

[22] Filed: Apr. 3, 1974

[21] Appl. No.: 457,502

[30] Foreign Application Priority Data

Apr. 5, 1973 Japan .......................... 48-41224[U]

[52] U.S. Cl. ........... 334/87; 74/10.15; 116/DIG. 31

[51] Int. Cl.$^2$ ............................................ H03J 1/02

[58] Field of Search ................................ 334/86–88; 116/DIG. 29, DIG. 31; 74/10.15, 10.41

[56] References Cited

UNITED STATES PATENTS

| | | | |
|---|---|---|---|
| 3,365,962 | 1/1968 | Smith | 74/10.15 |
| 3,774,459 | 11/1973 | Valdettaro | 74/10.41 |
| 3,777,576 | 12/1973 | Miner | 74/10.41 |
| 3,788,152 | 1/1974 | Miner | 74/10.15 |

*Primary Examiner*—Alfred E. Smith
*Assistant Examiner*—Wm. H. Punter
*Attorney, Agent, or Firm*—Craig & Antonelli

[57] ABSTRACT

A channel number indicating device is disclosed which is well suited for application in UHF tuner and includes a dial shaft fitted on a fine adjusting shaft which in turn is fitted on a channel switching shaft in concentric but encompassing relation, respectively. Selection of a channel is carried out by means of the dial shaft in cooperation with an indicating device provided on the dial shaft, for indicating a number of two figures. On the other hand, the fine adjusting shaft may be independently rotated, irrespective of the channel switching shaft and dial shaft, and is adapted to continuously rotate a tuner shaft of a tuner, thereby permitting fine adjustment.

18 Claims, 11 Drawing Figures

CHANNEL NUMBER INDICATING DEVICE FOR TELEVISION RECEIVER

BACKGROUND OF THE INVENTION

1. Field of the Invention

This invention relates to a channel indicating device for a tuner of a television receiver, and more particularly to a channel indicating device for UHF detent tuner, which has a plurality of channels and requires switching and selection of channels in clicking manner for each channel.

2. Description of the Prior Art

Allotted to U.S. television broadcasting are 12 channels for a VHF band and 70 channels for a UHF band. A VHF tuner for receiving 12 channels in VHF band selects a desired channel according to graded tuning, while a UHF tuner for receiving 70 channels in a UHF band selects a desired channel according to continuous tuning. The UHF tuner includes 70 channels within an angle of about 180° in a variable condenser, such that an angle allotted to one channel results in less than about 2.5°, thereby presenting difficulties in selecting channels. Accordingly, it remains desired for the UHF tuner to provide the graded selection of channels in a clicking manner as in the case with the VHF tuner. However, there still remains an unsolved problem of how definitely the channels selected among 70 channels is indicated and how the channel thus selected is associated with the tuner, in case the clicking type selection of channels is adopted for the UHF tuner.

SUMMARY OF THE INVENTION

It is an object of the present invention to provide a novel channel number indicating device for use in a television receiver, which avoids shortcomings experienced with the prior art device of this kind.

It is another object of the invention to provide a channel indicating device which is provided with a clicking function for each of 70 channels, has a dial drive means for channel numbers of the first and tenth orders and is adapted to clearly indicate the channel number selected.

It is a further object of the invention to provide a novel channel number indicating device, wherein a fine adjusting shaft is fitted on a channel switching shaft in encompassing relation thereto and is adapted for independent but continuous rotation for fine adjustment.

According to the present invention, there is provided a channel number indicating device which comprises a UHF tuner having a tuner shaft which is adapted to be rotated for selectively receiving a television signal; a channel switching shaft; a fine adjusting shaft fitted on said channel switching shaft in concentric but encompassing relation thereto; a dial shaft fitted on said fine adjusting shaft in encompassing relation; a clicking mechanism adapted for rotating said channel switching shaft in a clicking manner; means for covering the whole channels in the UHF band due to at least one rotation of said channel switching shaft; a gear group for interconnecting said tuner shaft of said UHF tuner and said channel switching shaft; an indicating disk for the first order and having digits ranging from 0 to 9 on the circumferential portion thereof, with openings interposed between each two of said digits; an indicating disk for the second order, which is adjacent to the back surface of said indicating disk for the first order and having digits ranging from 0 to 9, said indicating disks for the first and second orders being placed adjacent to each other on said dial shaft coaxially for their mutual cooperation; an indicating means for visually indicating the selected channel number of two figures by indicating the digit marked on said indicating disk for the second order through an opening provided in the indicating disk for the first order; and an intermittent feed or clicking mechanism for rotating said indicating disk for the second order through one allotted angle for each rotation of said channel switching shaft.

DESCRIPTION OF THE PREFERRED EMBODIMENTS

Figure 1:
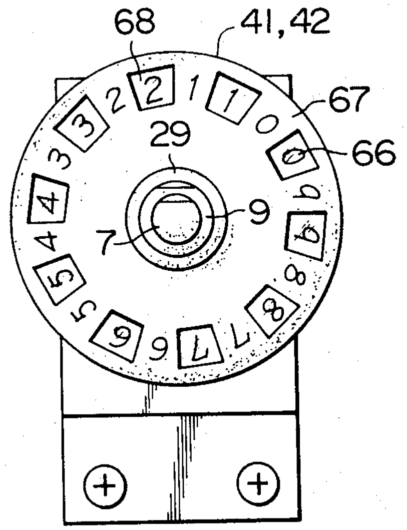
FIG. 1 is a plan view of a device embodying the present invention.

These and other objects and features of the present invention will be apparent from a reading of the ensuing part of the specification in conjunction with the accompanying drawings which indicate preferred embodiments of the present invention.

Throughout the figures shown herein, like parts are designated like reference numerals.

Figure 2:
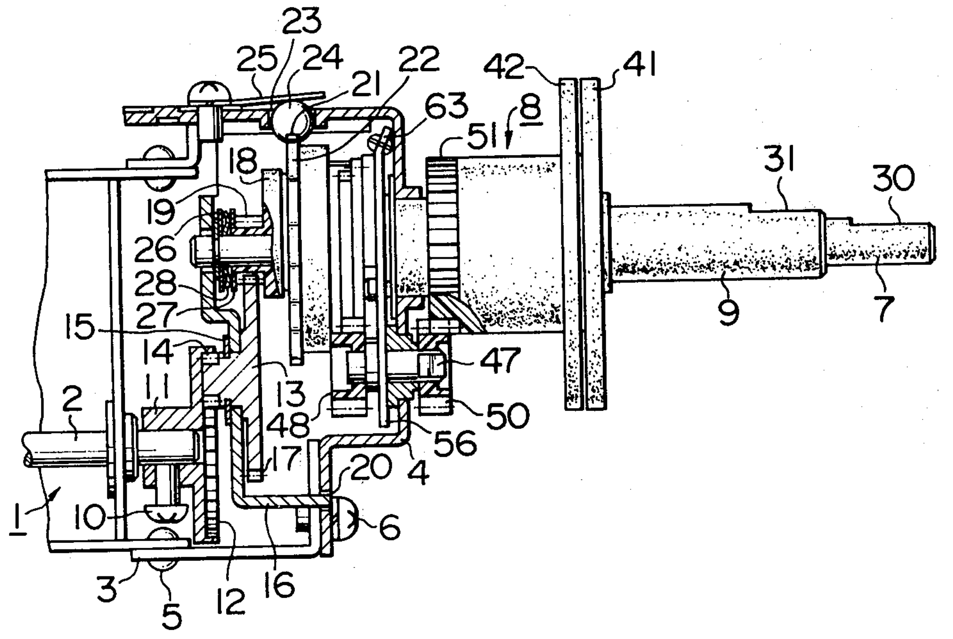
FIG. 2 is a side elevation, partly in cross section, of the device shown in FIG. 1.

As shown in FIGS. 1 and 2, a tuner shaft 2 is provided for a UHF tuner 1 of a continuous variable type, and thus a desired channel in the entire UHF television band may be selected due to the rotation of the tuner shaft through an angle of 180°. A drive mechanism for the tuner shaft 2 of the UHF tuner 1 as well as an intermittent feed mechanism for channel numbers are provided behind an attaching piece 3 and a front plate 4. The UHF tuner is secured to the attaching piece 3 by means of a screw 5, with the attaching piece being secured to the front plate by means of a screw 6.

The UHF tuner 1 may be roughly adjusted by rotating the channel switching shaft 7 and watching a channel number indicating means 8, while the fine adjustment is carried out by means of a fine adjusting shaft 9 fitted on the aforesaid channel switching shaft 7 in concentric but encompassing relation thereto.

Housed behind the attaching piece 3 and the front plate 4 is an extremely accurate drive mechanism of a compact size. As shown in FIG. 2, a variable condenser gear 11 is journaled on the tuner shaft 2 of the UHF tuner 1 and secured thereto by means of a screw 10. The variable condenser gear 12 has an internal gear 12 which meshes with a small gear 14 provided on an idler gear 13 having two, large and small gears, respectively. The idler gear 13 is retained by means of a E-ring 15 and rotatably journaled in a bearing piece 16. In addition, a large gear 17 integral with a small gear 14 of the idler gear 13 meshes with a gear 19 of the first gear 18 integral with a pin, while the first gear 18 is press-fitted on the channel switching shaft 7 at its end. Those gears are held in an intimate contact by means of a tension spring (not shown) confined between the retaining screw 10 of the variable condenser gear 11 and the attaching piece 3, thereby eliminating a spacing or clearance therebetween.

The rear end of the channel switching shaft 7 is coupled to bearing piece 16, while the channel switching shaft 7 is firmly supported by soldering one end of the bearing piece 16 into a square hole 20 provided in the front plate 4. Mounted on the channel switching shaft 7 are the first gear 18 and the switching cam 21. The switching cam 21 is formed with ten build-up cam surfaces 22, while a steel ball 24 fitted in a round hole 23 provided in the front plate 4 engages the aforesaid build-up cam surfaces, with the steel ball 24 being tightly urged against the cam surfaces 22 by a leaf spring 25. The first gear 18, which is rotatably journaled on the channel switching shaft 7, is urged against a side surface of the switching cam 21 by means of a wave washer 28 disposed between a retaining washer 26 and a flat washer 27, whereby the first gear 18 is imparted a friction force of a suitable magnitude for cooperation with the switching cam 21.

The gear ratios of the two, large and small gears 14, 17 of the idler gear 13 and internal gear 12 of the variable condenser gear 11 are each selected in such a manner that 4.9 rotations of the channel switching shaft 7 will results in the coverage of the entire band of the UHF tuner 1, because the switching cam 21 is divided into ten sections by cam surfaces 22. Since a single cam surface 22 of the switching cam 21 corresponds to a single channel, switching of channel switching shaft 7 along cam surfaces 22 of the switching cam 21 in a clicking manner will transmit its rotation from the gear 19 of the first gear 18 to the idler gear 13, after which the rotation thereof will be further decelerated and transmitted to the variable condenser gear 11, thereby rotating the variable condenser gear 11, coupled with the tuner shaft 2, whereby a desired channel may be selected.

Figure 3:
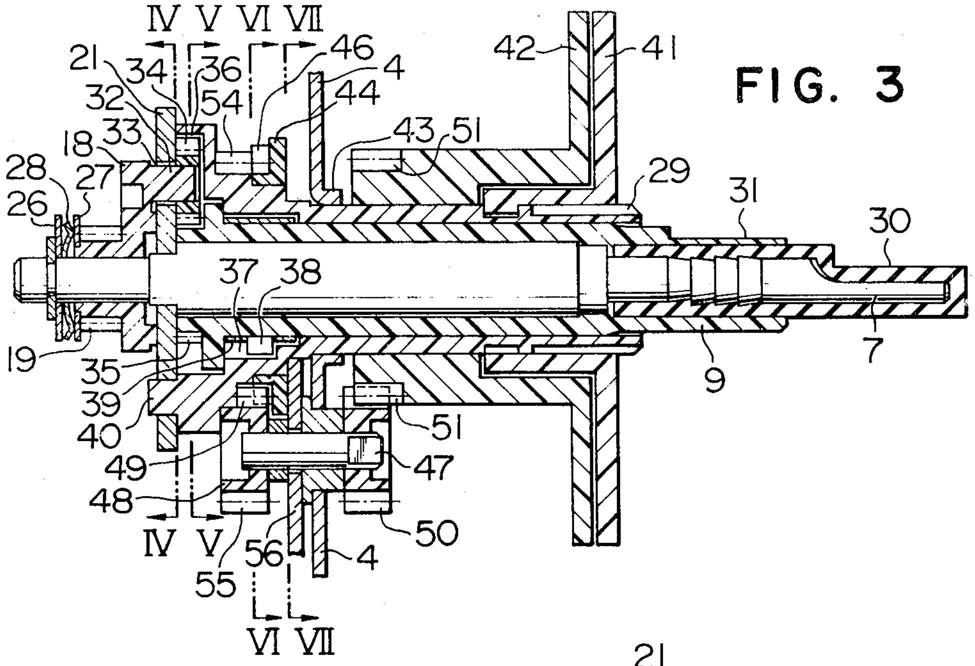
FIG. 3 is an enlarged, longitudinal crosssectional view of a rotating mechanism portion.

FIG. 3 illustrates the rotating mechanism, wherein the fine adjusting shaft 9 is fitted on the channel switching shaft 7 in concentric but encompassing relation thereto, and in addition the dial shaft 29 is fitted on the fine adjusting shaft 9 in encompassing relation thereto.

The channel switching shaft 7 is formed with a flat end portion 30 adapted to receive a channel selecting knob (not shown).

Figure 4:
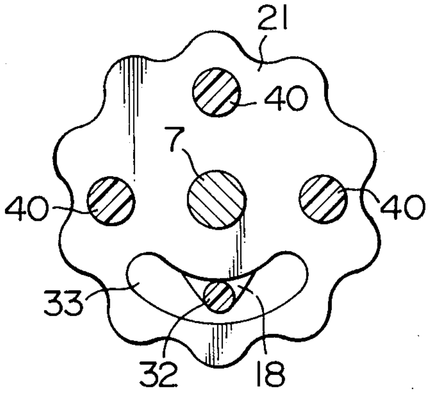
FIG. 4 is a cross-sectional view, taken along the line IV — IV of FIG. 3.
Figure 5:
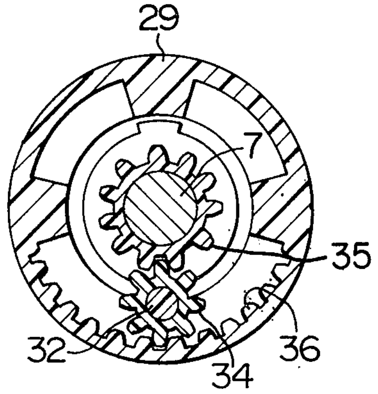
FIG. 5 is a cross-sectional view, taken along the line V — V of FIG. 3.
Figure 6:
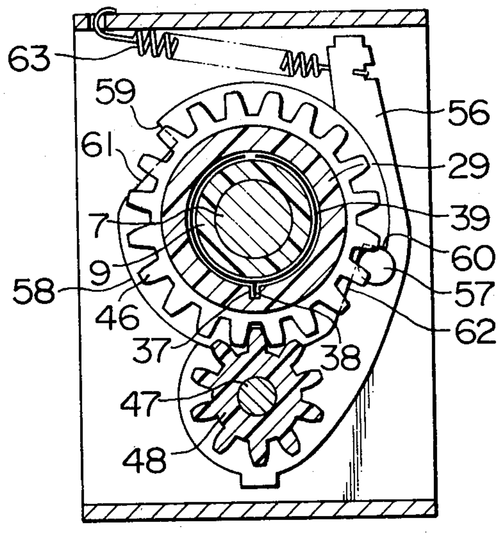
FIG. 6 is a cross-sectional view, taken along the line VI — VI of FIG. 3.

The fine adjusting shaft 9 which is fitted on the channel switching shaft 7 in concentric but encompassing relation, is formed with a flat end portion 31 adapted to receive a fine adjusting knob (not shown). The first gear 18 has a pin 32 integral therewith, which engages an ellipse hole 33 (FIG. 4). A planetary gear 34 is rigidly journaled on the pin 32 which projects from the switching cam 21. The planetary gear 34 meshes with a second gear 35 mounted on the end portion of the fine adjusting shaft 9 opposite to the flat end portion 31 thereof. Moreover, the planetary gear 34 meshes with an internal gear 36 journaled on the dial shaft 29. (FIG. 5). Journaled on the fine adjusting shaft 9 is a slip ring 39 whose projection 38 is fitted in a groove 37 provided in the dial shaft 29. (FIG. 6).

In case the fine adjustment is required for a specific UHF channel position of the channel switching shaft 7, the fine adjusting shaft 9 fitted on the channel switching shaft 7 is rotated. When the fine adjusting shaft 9 is rotated, then the fine adjusting shaft 9 will slip during the rotation, because the projection 38 of the slip ring 39 engages the dial shaft 29. As a result, the rotation of the fine adjusting shaft 9 will cause the rotation of the second gear 35. Then, the planetary gear 34, which is held between the second gear 35 and the internal gear 36 mounted on the dial shaft 29 in meshing relation to each other, is rotated in a direction opposite to that of the second gear 35. The rotation of the planetary gear 34 causes the pin 32 to move along the ellipse hole 33, together with the rotation of the planetary gear 34. The movement of the pin 32 will then cause the rotation of the first gear 18, such that the idler gear 13 meshing with the gear 19 of the first gear 18, and the variable condenser gear 11 are both rotated, whereby the tuner shaft 2 will be rotated through an extremely small angle.

The fine adjusting range due to the rotation of the fine adjusting shaft 9 is limited by means of the ellipse hole 33 provided in the switching cam 21.

The dial shaft 29 is secured to the switching cam 21 by means of a pin 40, whereby the switching cam 21 rotates together with the channel switching shaft 7, such that the dial shaft 29 rotates together with the channel switching shaft 7. Mounted on the dial shaft 29 are indicating disks 41 and 42 which are adapted to indicate the channel mumbers of the first and second orders and are rotatably held on the front plate 4 by means of the flanged bearing portion 43.

The cam member 44 is rotatably mounted on a shoulder portion 45 of the dial shaft 29, while the cam member 44 is provided with a series of gear teeth 46 which mesh with short gear teeth 49 of a feed gear member 48 mounted on the front plate 4 by means of a shaft 47. Journaled on the shaft 47 is an indicator gear 50 in addition to the feed gear member 48, and the indicator gear 50 is adapted to rotate together with the feed gear member 48. The indicator 50 meshes with a third gear 51 provided for the indicating disk 42 for the second order.

Figure 9:
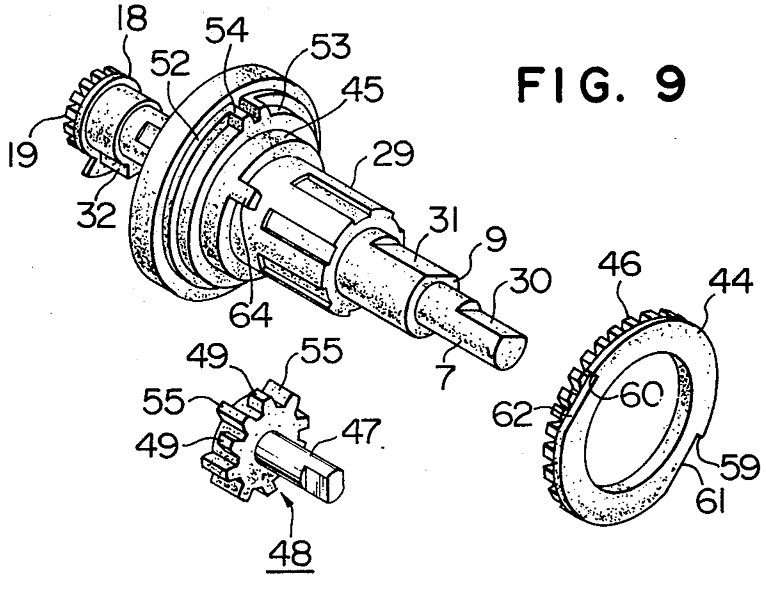
FIG. 9 is a perspective view of an intermittent feed mechanism.
Figure 10:
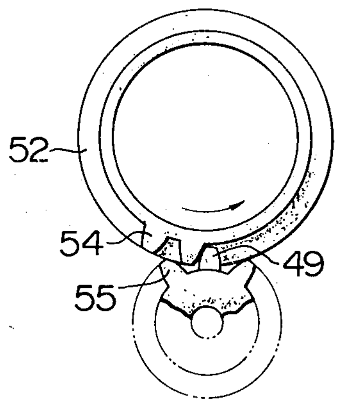
FIG. 10 is an explanatory view of the intermittent feed mechanism shown in FIG. 9.

As shown in FIG. 9, shoulder portions 52 and 53 are provided on the dial shaft 29, while the shoulder portions 52 and 53 are formed with two pieces of gear teeth 54 integrally, while the gear tooth 54 is adapted to serve as a gear with a tooth, when receiving one of longer gear teeth 55 provided on the feed gear member 48. The longer gear teeth 55 are located alternately with respect to the shorter gear teeth 49. The longer gear teeth 55 of the feed gear member 48 are usually rest on the flange portion 52 of the dial shaft 29 as shown in FIG. 10, while either of the longer or shorter gear teeth of the feed gear member 48 meshes with the gear teeth 46 of the cam member 44 at all times. However, when the dial shaft 29 is rotated and thus the gear teeth 54 are moved so as to engage one of the gear teeth 55, the feed gear member 48 will be rotated to an extent corresponding to two gear teeth, and so is rotated the cam member 44. Upon completion of the above rotations, the meshing relation between the gear teeth 54 and longer gear teeth 55 will be released, and the longer gear teeth 55 will remain still, until the subsequent one rotation of the channel switching shaft 7, i.e., the rotation of the dial shaft 29, because the longer gear teeth 55 rests on the flange portion 52. Accordingly, the indication disk 42 remains still without rotation, the aforesaid indicating disk 42 being associated with the channel numbers of the second order.

Figure 8:
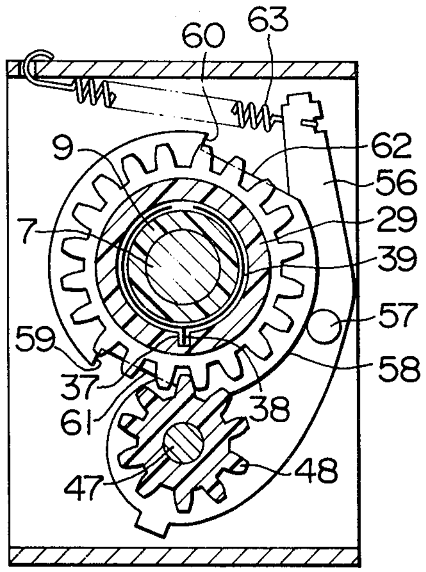
FIG. 8 is a cross-sectional view showing another condition of the feed mechanism shown in FIG. 6.

A stopper 56 is rotatably mounted on the shaft 47 in encompassing relation, the aforesaid stopper 56 being formed in its center with a projection 57 which normally rests on the outer circumference 58 of the cam member 44. FIG. 8 illustrates the condition referred to above. However, since the outer circumferential portion 58 of the cam member 44 is formed with sloped portions 61 and 62 which are adapted to be restricted for their movement by means of engaging portions 59 and 60, the outer circumferential portion 58 does not extend entirely around the cam member 44. A tension spring 63 is provided for the stopper 56, whereby the projection 57 is normally urged against the cam member 44.

Figure 7:
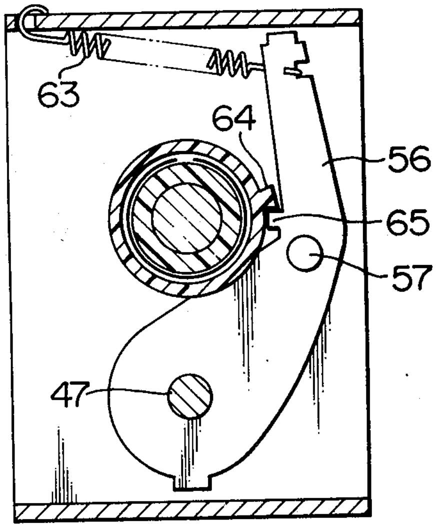
FIG. 7 is a cross-sectional view, taken along the line VII — VII of FIG. 3.

The projection 57 of the stopper 56 normally rests on the outer circumferential portion 58 of the cam member 44, as shown in FIG. 8, unless the projection 57 is positioned close to one end of the television band. Thus, since the outer circumferential portion 58 will remain still, even if the feed gear member 48 and cam member 44 rotate, the stopper also remains still. When the stopper 56 is moved by means of the feed gear member 48 from the condition shown in FIG. 8 to the position shown in FIG. 6, i.e., to a position close to one end of the television band (from 80th to 82nd channel), the stopper will be moved and the projection 57 will be detached from the outer circumferential portion 58 to ride on the sloped portion 62. Then, the retaining piece 65 for the stopper will be brought into engagement with the projection 64 on the dial shaft 29. Then, the switching shaft 7 is further rotated by three clicks in a clockwise direction, from the position shown in FIG. 6 where the projection 57 is moved toward the sloped portion 62 so as to abut the engaging portion 60. Then, as shown in FIG. 7, the projection 64 provided on the dial shaft 29 will abut the retaining piece 65 provided on the stopper 56, such that the rotation thereof will be interrupted. The retaining piece 65 of the stopper 56 positively prevents the further clockwise rotation of the channel switching shaft 7 from the position shown in FIG. 7.

When the stopper 56 is moved to a position close to the other end of the television band (14th channel to 19th channel), the projection 57 of the stopper 56 rests on the sloped portion 61 on the side opposite to that shown in FIG. 6, thereby abutting the engaging portion 59. Furthermore, the projection 64 of the dial shaft 29 will move from the position shown in FIG. 7 to underside of the retaining piece 65 of the stopper.

More particularly, there should be prevented the rotation of the switching shaft 7 in a counterclockwise direction for the 14th channel of the television band as well as the rotation of the switching shaft 7 in a clockwise direction for the 83rd channel of the television band, such that the stopper 56 will be moved only when moving between 19th channel and 20th channel and only when moving between 79th channel and 80th channel, while the projection 57 rests on the outer circumferential portion 58 except for the aforesaid period of time. In addition, although the feed gear member 48 and cam member 44 may move by means of the gear teeth 54, the stopper 56 will remain still, because the outer circumferential portion of the cam member 44 remains still.

The indicating plate 42 for the second order is formed with the third gear 51 at its one end, and the third gear 51 meshes with the indicator gear 50 which is adapted to rotate together with the feed gear member 48. The rotational ratio of the third gear 51 to the indicator is so selected as to be equal to that of the gear teeth 54 of the dial shaft 29 to the feed gear member 48. As shown in FIG. 1, provided on the front face of the indicating disk 42 for the second order are digits 66 ranging from 0 to 9 in equi-distant relation. The first order indicating disk 41 is mounted on the dial shaft 29 so as to rotate together with the dial shaft 29, having digits 67 ranging from 0 to 9 on its front face, with notches or transparent openings 68 being interposed between the two of the digits 67. The dial shaft 29 rotates in synchronism with the channel switching shaft 7. This then causes the rotation of the first order indicating disk 41 affixed thereto, whereby a number of the first order will appear in a given position, commensurate to the number of switching operations. Every ten clicks of the rotation of the channel switching shaft 7 causes the movement of the feed gear member 48, which has been transmitted through the gear teeth 54 of the dial shaft 29, to be transmitted by way of indicator 50 and the third gear 51 to the second order indicating disk 42, and thus the second order indicating disk will be rotated by one tenth of the rotation, i.e., one order is carried. Thus, this figure will appear through the opening 68 in the first order indicating disk 41.

Figure 11:
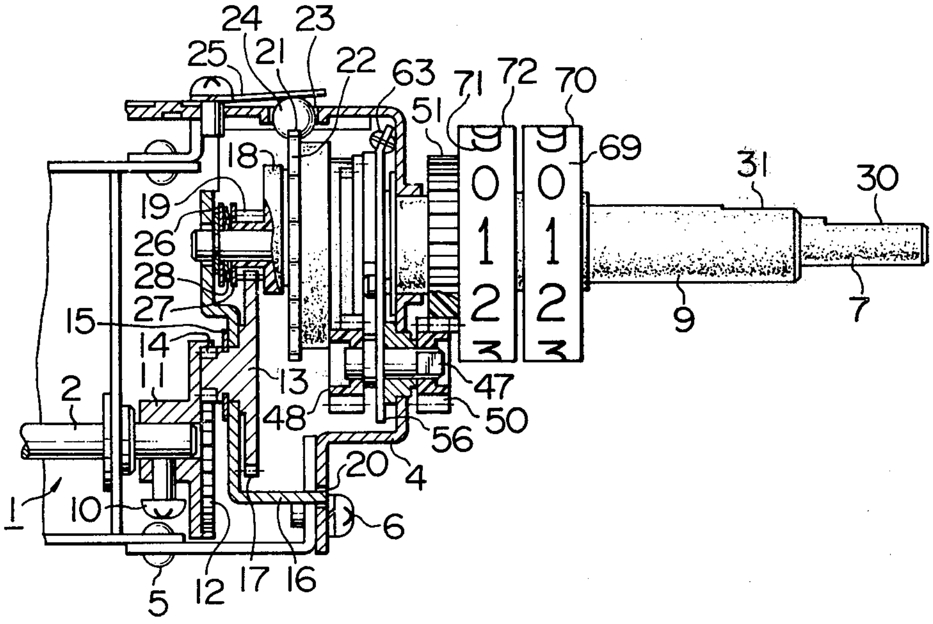
FIG. 11 is a side elevation, partly in cross section, of another embodiment of the invention.

FIG. 11 shows another embodiment of the present invention. The same shifting mechanism of the indicating device as well as the rotating mechanism of the tuner 1 as shown in FIGS. 2 through 10 are used, except for the first order indicating drum 70 having digits 69 ranging from 0 to 9 on its outer circumferential surface and a second order indicating drum 72 having digits 71 raning from 0 to 9 on the outer circumferential surface thereof, respectively.

What is claimed is:

1. A channel number indicating device for a television receiver comprising:

a UHF tuner having a shaft adapted to be rotated so as to selectively receive a television signal;

a channel switching shaft;

a fine adjusting shaft fitted on said channel switching shaft in concentric and encompassing relation thereto;

a dial shaft fitted on said fine adjusting shaft in encompassing relation thereto;

a clicking mechanism for rotating said channel switching shaft in a clicking manner;

means for covering the whole channels in a UHF band due to at least one rotation of said channel switching shaft;

a first gear group connected to said channel switching shaft for interconnecting said channel switching shaft and said shaft of said UHF tuner;

a first indicating disk having figures ranging from 0 to 9 on the circumferential portion thereof and openings between each two of said figures, and adapted to indicate figures of the first order;

a second indicating means having an indicating disk adapted to indicate figures of the second order, ranging from 0 to 9, both of said indicating disks being fitted on said dial shaft, said indicating disks for the first and second orders cooperating with each other for indicating a selected channel number of two figures in a manner that the figures of the second order are visible through said openings provided in said indicating disk for the first order;

an intermittent feed mechanism for rotating said indicating disk for the second order through a given angle per one rotation of said channel switching shaft;

a second gear group for connecting said fine adjusting shaft to said first gear group;

means for rotating said first gear group by way of said second gear group due to the rotation of said fine adjusting shaft to thereby continuously rotate said tuner shaft of said UHF tuner for fine adjustment;

gear means having two teeth portions provided for said dial shaft, and feed gear means having longer and shorter gear teeth, said longer gear teeth being adapted to mesh with said teeth portions for each rotation of said channel switching shaft, whereby said feed gear means is rotated to an extent corresponding to one clicking division of said channel switching shaft;

an indicator gear connected to said feed gear means and adapted to be rotated integrally with said feed gear means; and means for transmitting the rotation of the indicator gear to the indicating disk of the second order to thereby rotate said indicating disk of the second order to advance said disk by one figure.

2. A channel number indicating device according to claim 1, wherein said first gear group is frictionally connected to said channel switching shaft.

3. A channel number indicating device according to claim 1, wherein said second indicating disk is positioned to the back of said first indicating disk, and wherein both of said indicating disks are fitted coaxially on said dial shaft.

4. A channel number indicating device according to claim 1, wherein said intermittent feed mechanism rotates said indicating disk for the second order, by one click angle per one rotation of said channel switching shaft.

5. A channel number indicating device for a television receiver, comprising:

a UHF tuner having a shaft adapted to be rotated so as to selectively receive a television signal;

a channel switching shaft;

a fine adjusting shaft fitted on said channel switching shaft in concentric and encompassing relation thereto;

a dial shaft fitted on said fine adjusting shaft in encompassing relation thereto;

a clicking mechanism for rotating said channel switching shaft in a clicking manner;

means for covering the whole channels in a UHF band due to at least one rotation of said channel switching shaft;

a first gear group connected to said channel switching shaft for interconnecting said channel switching shaft and said shaft of said UHF tuner;

a first indicating disk having figures ranging from 0 to 9 on the circumferential portion thereof and openings between each two of said figures, and adapted to indicate figures of the first order;

a second indicating means having an indicating disk adapted to indicate figures of the second order, ranging from 0 to 9, both of said indicating disks being fitted on said dial shaft, said indicating disks for the first and second orders cooperating with each other for indicating a selected channel number of two figures in a manner that the figures of the second order are visible through said openings provided in said indicating disk for the first order;

an intermittent feed mechanism for rotating said indicating disk for the second order through a given angle per one rotation of said channel switching shaft;

a second gear group for connecting said fine adjusting shaft to said first gear group;

means for rotating said first gear group by way of said second gear group due to the rotation of said fine adjusting shaft to thereby continuously rotate said tuner shaft of said UHF tuner for fine adjustment;

a projection provided for said dial shaft;

a cam member having gear means and first engaging portions provided in part of a circular circumferential portion thereof;

a feed gear member for meshing with the gear means of said cam member to thereby transmit the rotation of said channel switching shaft to said cam member; and a stopper having a projection and a stopper engaging portion thereon;

said projection of said stopper being adapted to be slidingly urged against the circumference of said cam member to thereby bring said projection into engagement with said engaging portions of said cam member, whereby the stopper engaging portion will engage said projection of said dial shaft such that the stopper engaging portion is urged against said projection of said dial shaft to thereby restrict the rotation of said channel switching shaft.

6. A channel number indicating device according to claim 5, wherein said first gear group is frictionally connected to said channel switching shaft.

7. A channel number indicating device according to claim 5, wherein said second indicating disk is positioned to the back of said first indicating disk, and wherein both of said indicating disks are fitted coaxially on said dial shaft.

8. A channel number indicating device according to claim 5, wherein said intermittent feed mechanism rotates said indicating disk for the second order by one click angle per one rotation of said channel switching shaft.

9. A channel number indicating device for a television receiver, comprising:

a UHF tuner having a shaft adapted to be rotated so as to selectively receive a television signal;

a channel switching shaft;

a fine adjusting shaft fitted on said channel switching shaft in concentric and encompassing relation thereto;

a dial shaft fitted on said fine adjusting shaft in encompassing relation thereto;

a clicking mechanism for rotating said channel switching shaft in a clicking manner;

means for covering the whole channels in a UHF band due to at least one rotation of said channel switching shaft;

a first gear group connected to said channel switching shaft for interconnecting said channel switching shaft and said shaft of said UHF tuner;

a first indicating disk having figures ranging from 0 to 9 on the circumferential portion thereof and openings between each two of said figures, and adapted to indicate figures of the first order;

a second indicating means having an indicating disk adapted to indicate figures of the second order, ranging from 0 to 9, both of said indicating disks being fitted on said dial shaft, said indicating disks for the first and second orders cooperating with each other for indicating a selected channel number of two figures in a manner that the figures of the second order are visible through said openings provided in said indicating disk for the first order;

an intermittent feed mechanism for rotating said indicating disk for the second order through a given angle per one rotation of said channel switching shaft;

a second gear group for connecting said fine adjusting shaft to said first gear group;

means for rotating said first gear group by way of said second gear group due to the rotation of said fine adjusting shaft to thereby continuously rotate said tuner shaft of said UHF tuner for fine adjustment;

a switching cam having an elliptical hole therein;

a gear member having a first gear and a pin;

means mounted on said channel switching shaft for bringing said pin of said gear member in engagement with said elliptical hole provided in said switching cam;

a planetary gear secured to said pin;

a second gear mounted on said fine adjusting shaft;

an internal gear mounted on said dial shaft; and means for locating said planetary gear between said second gear and said internal gear for bringing said planetary gear into meshing relation to said second gear as well as to said internal gear.

10. A channel number indicating device according to claim 9, wherein said first group is frictionally connected to said channel switching shaft.

11. A channel number indicating device according to claim 9, wherein said second indicating disk is positioned to the back of said first indicating disk, and wherein both of said indicating disks are fitted coaxially on said dial shaft.

12. A channel number indicating device according to claim 9, wherein said intermittent feed mechanism rotates said indicating disk for the second order by one click angle per one rotation of said channel switching shaft.

13. A UHF tuner mechanism for a television receiver, comprising:

a UHF tuner having a tuner shaft for changing a synchronized frequency and being able to receive a plurality of UHF channels by one rotation of said tuner shaft in one direction;

a shaft mechanism having a channel switching shaft, a fine adjusting shaft fitted on said channel switching shaft in concentric and encompassing relation thereto, and a dial shaft fitted rotatably on said fine adjusting shaft in encompassing and concentric relation thereto;

a sprung ball latch mechanism for limiting the rotation of said channel switching shaft in a stepwise manner;

a gear group operatively connected to said tuner shaft;

frictional engaging means mounted on said channel switching shaft in a frictional relation thereto and operatively connected to said gear group for transmitting the rotation of said channel switching shaft to said tuner shaft;

a fine adjusting means operatively connected to said fine adjusting shaft and said frictional engaging means for transmitting the rotation of said fine adjusting shaft to said tuner shaft;

means for operatively connecting said dial shaft and said channel switching shaft for transmitting the rotation of said channel switching shaft to said dial shaft;

an indicating disk having digits ranging from 0 to 9 and secured to said dial shaft for indicating unit digits corresponding to the stepped positions of said channel switching shaft;

an indicating disk having digits ranging from 0 to 9 for indicating tens digits and fitted on said dial shaft rotatably in encompassing relation thereto;

means operatively connecting said dial shaft and the tens digits indicating disk for rotating said tens digits indicating disk intermittently for one allotted angle for each rotation of said channel switching shaft; and an indicating means for visually indicating a selected channel number of two figures in a manner that said unit and tens digits indicating disks cooperate to form the number of two figures and a digit on the tens digits indicating disk is watched through a window provided in the unit digits indicating disk.

14. A UHF tuner mechanism for a television receiver, as set forth in claim 13, wherein said means for rotating said tens digits indicating disk intermittently comprises:

a gear sector having two teeth and provided on said dial shaft;

a feed gear member having longer and shorter gear teeth, said longer teeth being adapted to mesh with said gear sector for each rotation of said channel switching shaft;

an indicator gear connected to said feed gear member and adapted to be rotated integrally with said feed gear member; and means for transmitting the rotation of the indicator gear to the tens digits indicating disk.

15. A UHF tuner mechanism according to claim 13, wherein said mechanism further comprises:

a projection provided for said dial shaft;

a cam member having gear means and first engaging portions provided in part of a circular circumferential portion thereof;

a feed gear member for meshing with the gear means of said cam member to thereby transmit the rotation of said channel switching shaft to said cam member; and a stopper having a projection and a stopper engaging portion midway thereof;

said projection of said stopper being adapted to be slidingly urged against the circumference of said cam member to thereby bring said projection into engagement with a first engaging portions of said cam member, whereby the stopper engaging portion will engage said projection of said dial shaft, such that the stopper engaging portion is urged against said projection of said shaft to thereby restrict the rotation of said channel switching shaft.

16. A UHF tuner mechanism according to claim 13, wherein said frictional engaging means transmits the rotation of said fine adjusting shaft to said tuner shaft via said gear group connected to said tuner shaft such that said tuner shaft rotates through an extremely small angle.

17. A UHF tuner mechanism according to claim 13, wherein said fine adjusting means includes:

a switching cam having an elliptical hole therein;

a gear member having a first gear and a pin;

means mounted on said channel switching shaft for bringing said pin of said gear member in engagement with said elliptical hole provided in said switching cam;

a planetary gear secured to said pin;

a second gear mounted on said fine adjusting shaft;

an internal gear mounted on said dial shaft; and means for locating said planetary gear between said second gear and said internal gear for bringing said planetary gear into meshing relation to said second gear as well as to said internal gear.

18. A UHF tuner mechanism according to claim 17, wherein said frictional engaging means transmits the rotation of said fine adjusting shaft to said tuner shaft via said gear group connected to said tuner shaft such that said tuner shaft rotates through an extremely small angle.

* * * * *